United States Patent
Ojala et al.

(10) Patent No.: US 9,097,795 B2
(45) Date of Patent: Aug. 4, 2015

(54) PROXIMITY DETECTING APPARATUS AND METHOD BASED ON AUDIO SIGNALS

(75) Inventors: Pasi Ojala, Kirkkonummi (FI); Ole Kirkeby, Espoo (FI)

(73) Assignee: Nokia Technologies Oy, Espoo (FI)

( * ) Notice: Subject to any disclaimer, the term of this patent is extended or adjusted under 35 U.S.C. 154(b) by 132 days.

(21) Appl. No.: 13/883,660

(22) PCT Filed: Nov. 12, 2010

(86) PCT No.: PCT/IB2010/055143
§ 371 (c)(1),
(2), (4) Date: May 6, 2013

(87) PCT Pub. No.: WO2012/063104
PCT Pub. Date: May 18, 2012

(65) Prior Publication Data
US 2013/0223188 A1    Aug. 29, 2013

(51) Int. Cl.
G01S 15/04 (2006.01)
G01S 15/00 (2006.01)
H04M 9/08 (2006.01)
H04M 1/60 (2006.01)

(52) U.S. Cl.
CPC ............... *G01S 15/04* (2013.01); *G01S 15/003* (2013.01); *H04M 9/08* (2013.01); *H04M 9/082* (2013.01); *H04M 1/6008* (2013.01); *H04M 2250/12* (2013.01)

(58) Field of Classification Search
CPC ....... G01S 15/00; G01S 15/04; G01S 15/003; G01S 15/88; G01S 15/89; G01S 15/102
USPC ......... 367/93, 95, 96, 99, 118, 127; 455/90.1, 455/90.3, 355, 569.1, 456, 456.1, 569
See application file for complete search history.

(56) References Cited

U.S. PATENT DOCUMENTS

| | | | |
|---|---|---|---|
| 5,872,743 A | | 2/1999 | Maxwell |
| 6,925,296 B2 * | | 8/2005 | Mattisson ..................... 455/355 |
| 6,952,672 B2 * | | 10/2005 | Smith ........................... 704/226 |
| 8,189,429 B2 * | | 5/2012 | Chen et al. ..................... 367/118 |
| 8,456,809 B2 * | | 6/2013 | Kim et al. ................ 361/679.01 |
| 2004/0253994 A1 | | 12/2004 | Lampl et al. |
| 2008/0304361 A1 * | | 12/2008 | Peng et al. .................... 367/127 |

FOREIGN PATENT DOCUMENTS

| | | |
|---|---|---|
| EP | 1174732 | 1/2002 |
| WO | 2009122193 | 10/2009 |

OTHER PUBLICATIONS

International Search Report received for corresponding Patent Cooperation Treaty Application No. PCT/IB2010/055143, dated Aug. 3, 2011, 5 pages.

* cited by examiner

*Primary Examiner* — Hung T Nguyen
(74) *Attorney, Agent, or Firm* — Harrington & Smith

(57) ABSTRACT

Apparatus comprising at least one processor and at least one memory including computer code, the at least one memory and the computer code configured to with the at least one processor cause the apparatus to at least perform: determining at least one impulse response model pulse train from at least one audio signal; and determining an presence of an object from the at least one impulse model pulse train.

18 Claims, 9 Drawing Sheets

PROXIMITY DETECTING APPARATUS AND METHOD BASED ON AUDIO SIGNALS

RELATED APPLICATION

This application was originally filed as PCT Application No. PCT/IB10/055143 filed Nov. 12, 2010.

FIELD OF THE APPLICATION

The present invention relates to apparatus for the processing of audio signals for proximity detection. The invention further relates to, but is not limited to, apparatus for processing audio signals for proximity detection in mobile devices.

BACKGROUND OF THE APPLICATION

In electronic devices it is often useful to be able to determine when another object is in proximity to it. For example in devices with speakers the device can be operated such that when a user is in proximity to the device the speaker does not output potentially harmful sound pressure levels (SPL) capable of temporally or permanently damaging the users hearing. Furthermore some devices can be controlled by determining object proximity or 'gestures'. For example a call can be initialized by the detection of a 'make call' gesture or the volume of playback increased or decreased by the detection of a 'change volume' gesture.

Typically proximity detection can be implemented by the use of photo-detector which detects a lowering of the light level as the user approaches the device and casts the device in a shadow region. However such photo-detection requires a camera or other photo-detector equipment and furthermore can be found to be unreliable and inaccurate dependent on the placing of the sensor and the sensitivity of the light detecting sensor. In some embodiments a light source such as a LED can be employed on the device and the light level reflected from the neighbouring object detected to provide a rough location and motion estimate of the neighbouring object. However these rely on the reflectivity of the neighbouring object to determine an approximate distance and can therefore produce inaccurate distances for objects with reflectivity differing from the expected values.

Audio based proximity sensing has also been proposed where a predetermined audio signal is emitted by one or more speakers mounted in the electronic device and the corresponding signal is detected when it arrives at the microphone, either directly from the speaker or reflected from objects in proximity to the device. The time taken for the audio signal to travel from the loudspeaker to the microphone is then measured and a distance from the reflecting object to the device that emits and detects the sound can thus be determined knowing the speed of sound.

Devices using only one sound source (speaker) and one sound sink (microphone) enables the time of flight estimation to provide information only about the distance of the object reflecting the audio signal, but cannot determine the location, the direction of the object, or the direction of motion of the object.

A sonar type of device configured to measure the time it takes for the audio burst to travel from the speaker to the microphone and determines the corresponding direction when the speed of sound is known in the surrounding medium, such as air or water using a microphone array consisting of at least two microphones can for example determine both distance and direction. Typically, the output of the array is the sum signal of all microphones. Turning the array and detecting the direction that provides the highest amount of energy of the signal of interest is the most straightforward method to estimating the direction of arrival.

This steering of the array, i.e. turning the array towards the point of interest without physically turning the device is typically implemented by using the sound wave interference phenomena resulting from adjusting microphone delay lines. For example, a two microphone array can be aligned off the perpendicular axis of the microphones by delaying the second microphone output signal relative to the first by certain amount before summing them up. The time delay providing the maximum energy of the sum signal can then be determined to correspond to the direction of arrival.

When the distance between the microphones, the required time delay, and the speed of sound are known, determining the direction of arrival of the sound source is possible by detecting the inter channel time and level differences and using simple trigonometry. A more straightforward method for estimating the direction of arrival is by detecting the amplitude differences of the microphone signals since the further the sound has to travel the more it is attenuated.

However such multiple microphone arrays implemented in devices increase the complexity of such devices and furthermore can require microphone elements to be placed at locations about the device further increasing cost and size of the device.

SUMMARY OF SOME EMBODIMENTS

Embodiments of the present invention attempt to determine location and track object proximity using only one microphone.

There is provided according to the invention apparatus comprising at least one processor and at least one memory including computer code, the at least one memory and the computer code configured to with the at least one processor cause the apparatus to at least perform determining at least one impulse response model pulse train from at least one audio signal; and determining an presence of an object from the at least one impulse model pulse train.

Determining the presence of an object from the at least one impulse model pulse train may cause the apparatus to perform: determining an object reflection pulse train delay value; and determining an object reflection distance based on the object reflection pulse train delay value.

The apparatus may be further caused to perform: determining the object reflection distance is less than a first defined value; and controlling a function of the apparatus dependent on determining the object reflection distance is less than a first defined value.

Controlling a function of the apparatus may cause the apparatus to perform at least one of: controlling a speaker output level; and waking the apparatus from standby.

Determining at least one impulse model pulse train may cause the apparatus to perform determining at least two distinguishable signal impulse model pulse trains and determining the object from the at least one impulse model pulse train causes the apparatus to perform: determining an object reflection pulse train delay value for each impulse model pulse train; and determining an object location based on the object reflection pulse train delay value for each impulse model pulse train.

The apparatus may be further caused to perform determining from at least two object locations a motion of the object.

The apparatus may be further caused to perform receiving at a microphone the at least one audio signal.

The apparatus may be further caused to perform: transmitting from a first speaker a first audio signal; and transmitting from a second speaker a second audio signal; wherein the at least one signal comprises the combination of the direct pathway and reflected pathway first and second audio signals.

Determining the impulse response model pulse train may cause the apparatus to perform: transforming the at least one audio signal into a sparse domain representation domain; and sparse sensing the at least one audio signal in the sparse representation domain to determine the impulse response model pulse train.

Transforming the at least one audio signal into a sparse representation domain may cause the apparatus to perform cross-correlating the at least one audio signal against a reference signal.

The apparatus may further perform framing the at least one audio signal before cross-correlating.

Sparse sensing the at least one audio signal in the sparse representation domain may cause the apparatus to perform: discrete fourier transforming the sparse domain representation at least one audio signal; organize the discrete fourier transform products into a Toeplitz form; determine the annihilating filter roots associated with the Toeplitz form discrete fourier transform products; and determine the impulse response model pulse train pulse times and amplitudes based on the annihilating filter root values.

The apparatus may be further caused to perform denoising the Toeplitz form discrete fourier transform products before determining the annihilating filter roots.

According to a second aspect of the application there is provided a method comprising: determining at least one impulse response model pulse train from at least one audio signal; and determining an presence of an object from the at least one impulse model pulse train.

Determining the presence of an object from the at least one impulse model pulse train may comprise: determining an object reflection pulse train delay value; and determining an object reflection distance based on the object reflection pulse train delay value.

The method may further comprise: determining the object reflection distance is less than a first defined value; and controlling a function of the apparatus dependent on determining the object reflection distance is less than a first defined value.

controlling a function of the apparatus may comprise at least one of: controlling a speaker output level; and waking the apparatus from standby.

Determining at least one impulse model pulse train may comprise determining at least two distinguishable signal impulse model pulse trains and determining the object from the at least one impulse model pulse train may comprise: determining an object reflection pulse train delay value for each impulse model pulse train; and determining an object location based on the object reflection pulse train delay value for each impulse model pulse train.

The method may further comprise determining from at least two object locations a motion of the object.

The method may further comprise receiving at a microphone the at least one audio signal.

The method may further comprise: transmitting from a first speaker a first audio signal; and transmitting from a second speaker a second audio signal; wherein the at least one signal comprises the combination of the direct pathway and reflected pathway first and second audio signals.

Determining the impulse response model pulse train may comprise: transforming the at least one audio signal into a sparse representation domain; and sparse sensing the at least one audio signal in the sparse representation domain to determine the impulse response model pulse train.

Transforming the at least one audio signal into a sparse representation domain may comprise cross-correlating the at least one audio signal against a reference signal.

The method may further comprise framing the at least one audio signal before cross-correlating.

Sparse sensing the at least one audio signal in the sparse representation domain may comprise: discrete fourier transforming the sparse domain representation of at least one audio signal; organizing the discrete fourier transform products into a Toeplitz form; determining the annihilating filter roots associated with the Toeplitz form discrete fourier transform products; and determining the impulse response model pulse train pulse times and amplitudes based on the annihilating filter root values.

The method may further comprise denoising the Toeplitz form discrete fourier transform products before determining the annihilating filter roots.

According to a third aspect of the application there is provided an apparatus comprising: an impulse response modeller configured to determine at least one impulse response model pulse train from at least one audio signal; and a pulse train analyser configured to determine an presence of an object from the at least one impulse model pulse train.

The pulse train analyser may comprise a delay determiner configured to determine an object reflection pulse train delay value; and the apparatus may comprise an object distance determiner configured to determine an object reflection distance based on the object reflection pulse train delay value.

The apparatus may further comprise: a distance threshold determiner configured to determine the object reflection distance is less than a first defined value; and function controller configured to control a function of the apparatus dependent on determining the object reflection distance is less than a first defined value.

The controller may comprise at least one of: speaker level controller configured to control a speaker output level; and a standby controller configured to wake the apparatus from standby.

The impulse response modeller may comprise a signal separator configured to determine at least two distinguishable signal impulse model pulse trains.

The signal selector may comprise at least one of: a frequency filter, a temporal filter, a spatial filter.

The pulse train analyser may comprise: a distinguishable signal delay determiner configured to determine an object reflection pulse train delay value for each impulse model pulse train; and an object location determiner configured to determine an object location based on the object reflection pulse train delay value for each impulse model pulse train.

The apparatus may further comprise a motion determiner configured to determine from at least two object locations a motion of the object.

The apparatus may further comprise a microphone configured to receive the at least one audio signal.

The apparatus may further comprise: a first speaker configured to transmit a first audio signal and a second speaker configured to transmit a second audio signal.

The at least one audio signal may comprise a combination of the direct pathway and reflected pathway first audio signal and the direct pathway and reflected pathway second audio signals.

The impulse response modeller may comprise: a sparse domain transformer configured to transform the at least one audio signal into a sparse representation domain; and a sparse domain determiner configured to sparse sense the at least one audio signal in the sparse representation domain to determine the impulse response model pulse train.

The sparse domain transformer may comprise a cross-correlator configured to cross-correlate the at least one audio signal against a reference signal.

The reference signal may comprise at least one of the first and second audio signals transmitted by the speaker.

The apparatus may further comprise a framer configured to frame the at least one audio signal before cross-correlating.

The sparse domain determiner may comprise: a discrete fourier transformer configured to transform the sparse domain representation of the at least one audio signal; a Toeplitz matrix generator configured to organize the discrete fourier transform products into a Toeplitz form; an annihilating filter determiner configured to determine the annihilating filter roots associated with the Toeplitz form discrete fourier transform products; and a pulse time and amplitude determiner configured to determine the impulse response model pulse train pulse times and amplitudes based on the annihilating filter root values.

The apparatus may further comprise a denoiser configured to denoise the Toeplitz form discrete fourier transform products before determining the annihilating filter roots.

According to a fourth aspect of the application there is provided an apparatus comprising: means for determining at least one impulse response model pulse train from at least one audio signal; and means for determining an presence of an object from the at least one impulse model pulse train.

The means for determining the presence of an object from the at least one impulse model pulse train may comprise: means for determining an object reflection pulse train delay value; and means for determining an object reflection distance based on the object reflection pulse train delay value.

The apparatus may further comprise: means for determining the object reflection distance is less than a first defined value; and means for controlling a function of the apparatus dependent on determining the object reflection distance is less than a first defined value.

The means for controlling a function of the apparatus may comprise at least one of: means for controlling a speaker output level; and means for waking the apparatus from standby.

The means for determining at least one impulse model pulse train may comprise means for determining at least two distinguishable signal impulse model pulse trains and the means for determining the object from the at least one impulse model pulse train may comprise: means for determining an object reflection pulse train delay value for each impulse model pulse train; and means for determining an object location based on the object reflection pulse train delay value for each impulse model pulse train.

The apparatus may further comprise means for determining from at least two object locations a motion of the object.

The apparatus may further comprise means for receiving the at least one audio signal.

The apparatus may further comprise: first means for transmitting a first audio signal; and second means for transmitting a second audio signal.

The at least one signal comprises the combination of the direct pathway and reflected pathway first and second audio signals.

The means for determining the impulse response model pulse train may comprise: means for transforming the at least one audio signal into a sparse representation domain; and means for sparse sensing the at least one audio signal in the sparse representation domain to determine the impulse response model pulse train.

The means for transforming the at least one audio signal into a sparse representation domain may comprise means for cross-correlating the at least one audio signal against a reference signal.

The apparatus may further comprise means for framing the at least one audio signal before cross-correlating.

The means for sparse sensing the at least one audio signal in the sparse representation domain may comprise: means for discrete fourier transforming the sparse domain representation of at least one audio signal; means for organizing the discrete fourier transform products into a Toeplitz form; means for determining the annihilating filter roots associated with the Toeplitz form discrete fourier transform products; and means for determining the impulse response model pulse train pulse times and amplitudes based on the annihilating filter root values.

The apparatus may further comprise means for denoising the Toeplitz form discrete fourier transform products before determining the annihilating filter roots.

An electronic device may comprise apparatus as described above.

A chipset may comprise apparatus as described above.

Embodiments of the present application aim to address the above problems.

BRIEF DESCRIPTION OF DRAWINGS

For better understanding of the present application, reference will now be made by way of example to the accompanying drawings in which.

SOME EMBODIMENTS OF THE APPLICATION

The following describes in further detail suitable apparatus and possible mechanisms for the provision of compressed or compressive sampling of an audio signal for at least one audio channel.

Figure 1:
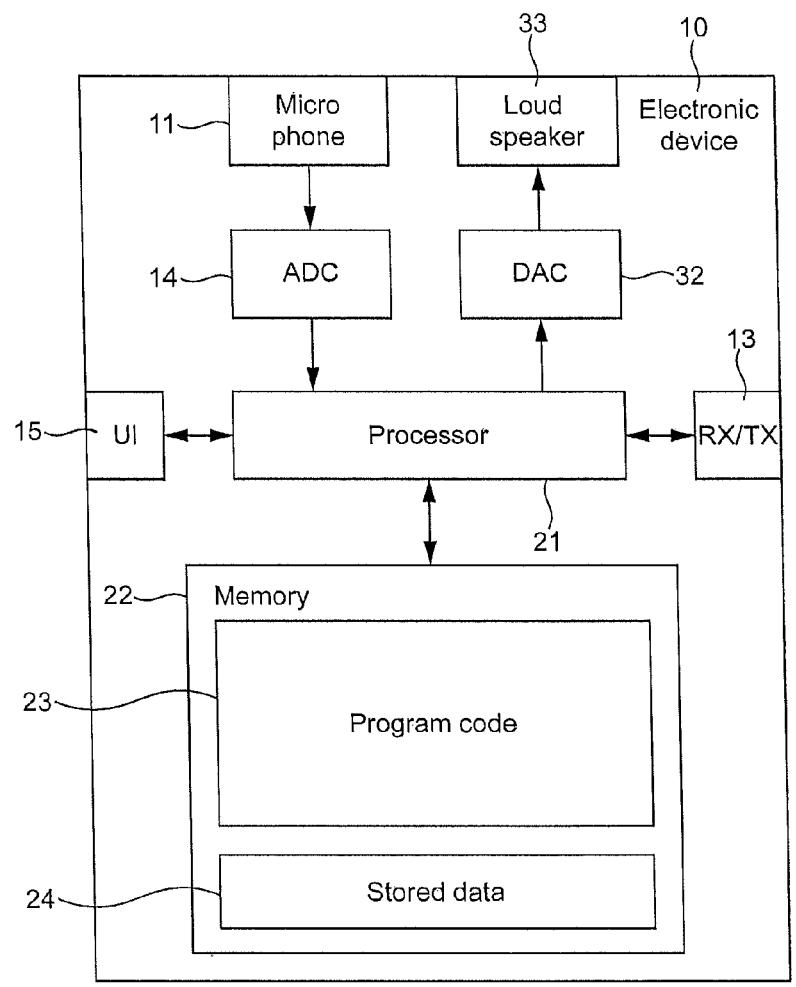
FIG. 1 shows schematically an apparatus suitable for employing some embodiments of the application.

With respect to FIG. 1 a schematic diagram of an exemplary apparatus or electronic device 10 which may be used to perform proximity object determination according to some embodiments of the application is shown. The apparatus 10 can in some embodiments be a mobile terminal or user equipment of a wireless communication system. In other embodiments the apparatus 10 can be any suitable audio or audio subsystem component within an electronic device. For example in some embodiments the electronic device or apparatus 10 can be an audio player (also known as MP3 player), a media player (also known as MP4 player), or any suitable audio capture/audio rendering device incorporating the codecs as described hereafter.

The electronic device 10 in some embodiments comprises at least one microphone 11, which is connected via an analogue-to-digital converter (ADC) 14 to a processor 21. The processor 21 is further linked via a digital-to-analogue converter (DAC) 32 at least two speakers 33. The processor 21 is in some further embodiments further connected or linked to a transceiver (RX/TX) 13, and also to a user interface (UI) 15 and to a memory 22.

The processor 21 can in some embodiments be configured to execute various program codes. The implemented program code can in some embodiments comprise audio processing code as described herein for performing proximate object determination and/or tracking. The implemented program codes can in some embodiments be stored, for example, within the memory 22 and specifically within a program code section 23 of the memory 22 for retrieval by the processor 21 whenever needed. The memory 22 can in some further embodiments provide a data storage section 24, for example for storing data which has been processed in accordance with embodiments of the application, and/or storing data prior to processing according to embodiments of the application.

The processing code can in some embodiments of the application be implemented at least partially in hardware or firmware where specified hardware is provided to carry out the operations disclosed hereafter.

The user interface 15 enables a user to input commands to the apparatus 10, for example via a keypad, and/or to obtain information from the apparatus 10 for example via a display. It would be understood that in some embodiments the operations of input of data and display of data can be implemented by a touch screen display.

The transceiver 13 can be configured in some embodiments to enable communication with other devices, for example via a wireless communications network.

It is to be understood that the structure of the apparatus 10 could be supplemented and varied in many ways and only schematically represents the components or features which are directly concerned with some embodiments of the application.

Figure 2:
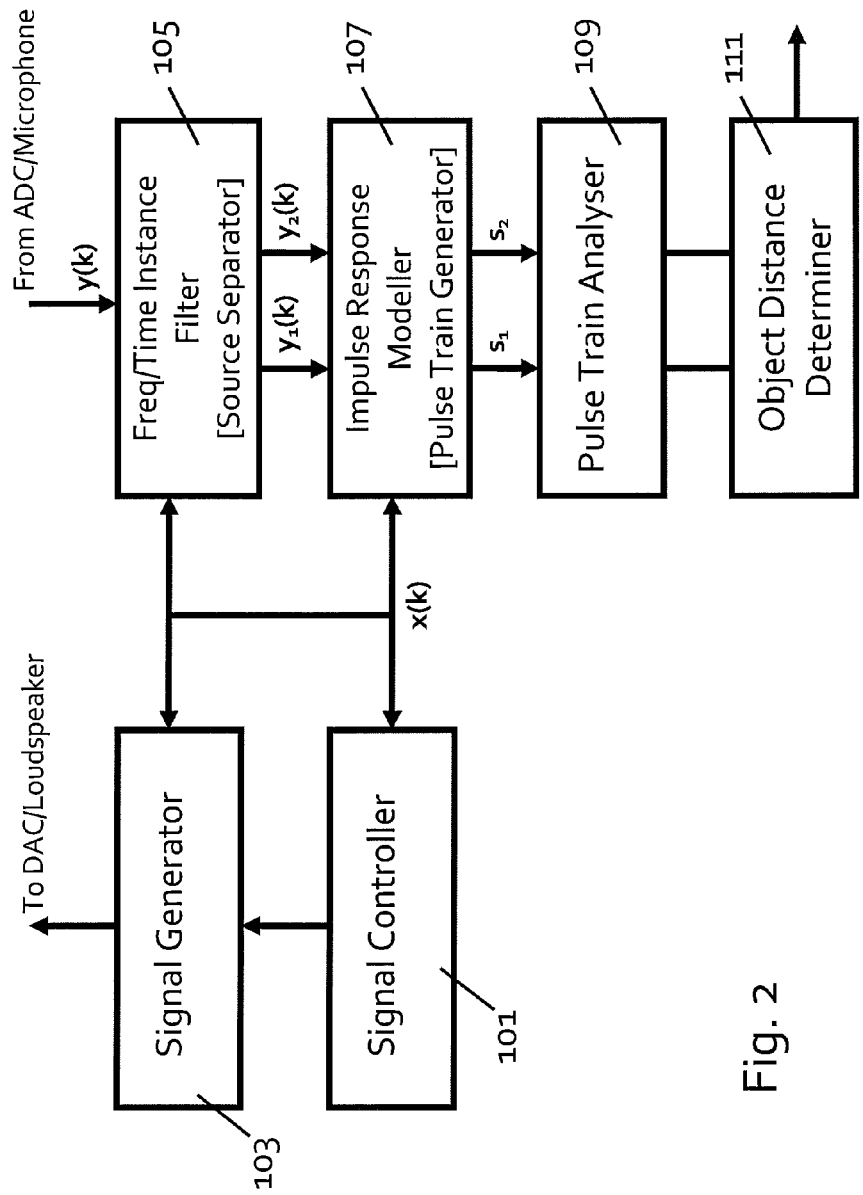
FIG. 2 shows schematically the apparatus shown in FIG. 1 in further detail.

With respect to FIG. 2 an overview of the apparatus 10 shown in further detail with respect to embodiments of the application is shown. Furthermore with respect to FIG. 4 the operation of the apparatus according to embodiments of the application is further shown.

The apparatus 10 can in some embodiments comprise a signal controller 101. The signal controller 101 is configured to operate in such a way to control the apparatus to detect, determine, or track whether an object is in proximity to the apparatus using the speaker and microphone apparatus. In such embodiments the signal controller can be configured to pass a signal to the signal generator enabling the signal generator to operate according to embodiments of the application, furthermore the signal controller 101 can furthermore be configured to enable the filter 105 and impulse response modeller 107 to be enabled and thus be receptive for determining an object in proximity to the apparatus. In some embodiments the signal controller 101 and/or operations can be implemented locally within the other components described herein, such as for example the signal generator 103, frequency time instance filter 105 and impulse response modeller 107.

In some embodiments of the apparatus 10 comprises a signal generator 103. The signal generator 103 is configured to generate a signal suitable to pass to the speakers 33 via the digital to analogue converter (DAC) 32. In some embodiments the signal generator 103 can be configured to pass a first signal to a first loudspeaker 33a and a second signal to a second loudspeaker 33b whereby the first signal and a second signal are separated by a time period. In other words the signal generator 103 performs time division multiplexing (TDM) of generated signals. In some further embodiments the signal generator 103 is configured to generate the first signal at a first frequency range and the second signal at a second frequency range whereby the first and second frequency ranges do not overlap or do not significantly overlap. In other words the signal generator 103 is configured to perform frequency division multiplexing (FDM). By doing so in such embodiments the signal generator is configured to generate signals for each of the loudspeakers or loudspeaker groups, which in this example is two distinguishable signals for two loudspeakers, which are separate or distinguishable. Although in the examples herein two distinguishable signals are generated and output separately by two speakers more than two signals can be generated and output by more than two speakers to assist in the proximity determination operation.

Figure 4:
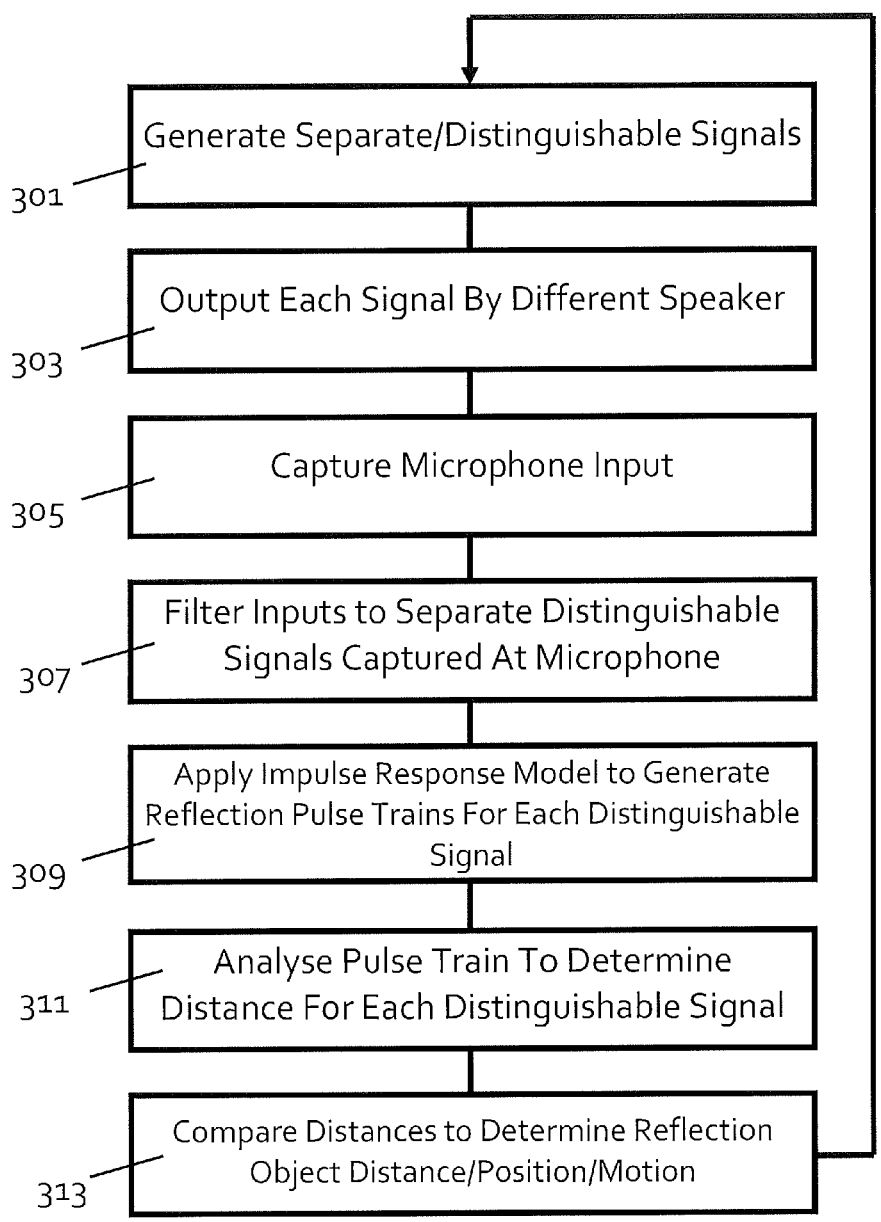
FIG. 4 shows a flow diagram showing the operation of determining a proximate object according to some embodiments of the application.

The operation of generating separate or distinguishable signals is shown in FIG. 4 by step 301.

The signal generator 103 outputs each signal to each loudspeaker such that each separate or distinguishable signal is passed to a different speaker or speaker group to be output. The apparatus may therefore be considered in at least one embodiment comprise: first means for transmitting a first audio signal; and second means for transmitting a second audio signal.

The operation of outputting each signal to each speaker and furthermore outputting each signal by each speaker is shown in FIG. 4 by step 303.

The microphone 11 can be configured to receive the direct and reflected versions of the signals output by each speaker 33. Furthermore as described above in some embodiments each microphone passes the signal to an analogue to digital converter (ADC) 14 to convert the signal into a suitable digital form to be processed.

In some embodiments the microphones pass via the analogue to digital converter the received or captured signal to the frequency/time instance filter 105. In other word in at least one embodiment the apparatus may further comprise means for receiving the at least one audio signal and where the at least one signal received by the means for receiving comprises the combination of the direct pathway and reflected pathway first and second audio signals.

The capturing of the microphone input is shown in FIG. 4 by step 305.

The apparatus in some embodiments comprises a frequency/time instance filter 105. The frequency/time instance filter is configured to separate the sources or signals output via the speakers by a suitable filtering. Thus in some embodiments, where the output signals were time division multiplexed, the frequency/time instance filter 105 is configured to separate from the received signal y(k) a first $y_1(k)$ and a second $y_2(k)$ signals by switching the captured output for a first time period and a second time period respectively.

In some embodiments, where the generated signals were frequency division multiplexed, the frequency/time instance filter 105 comprises a frequency filter such as a suitable band pass, low pass or high pass filter the captured signals to separate them into the captured first signal $y_1(k)$ and captured second signal $y_2(k)$.

For example, the first source or speaker 33a may emit a predetermined signal pattern in the frequency range 18-20 kHz, while a second source or speaker 33b operates in the range 20-22 kHz. In such embodiments the frequency/time instance filter 105 comprises a first pass band filter in the range 18-20 kHz to separate the first speaker signal from the captured audio signal and a second pass band filter in the range 20-22 kHz to separate the second speaker signal from the captured audio signal.

Although in the following examples two signals are used, it would be appreciated that more than two signals can be processed in some embodiments.

The filtering of inputs to separate distinct signals captured by the microphone is shown in FIG. 4 by step 307.

In some embodiments the apparatus can comprise an impulse response modeller 107. The impulse response modeller 107 is configured to receive the output of the frequency/time instance filter 105, in other words the captured signals associated with each of the source signals received by the direct and reflected paths, and model the impulse response of the captured signals such that the direct pathway and reflected pathway can be determined or modelled as a series of pulses. In other words an impulse response model is applied to the received or captured signal by the impulse response modeller which generates a direct and reflection pulse train for each distinguishable signal. The pulse train output $S_1$ and $S_2$ associated with the captured first signal and the captured second signal respectively (for the two signal example) is in some embodiments passed to a pulse train analyser 109. Thus in some embodiments the application comprises means for determining at least one impulse response model pulse train from at least one audio signal.

In other words the microphone input can be considered to comprise two components: the direct sound from the loudspeaker and the reflected sound bouncing off the object in proximity to the device. As the sound source, the generated signal originating both signals is the same, the model for the microphone signal can be written as a convolution:

$$y(n)=h(n)*x(n),$$

where y(n) is the microphone signal, x(n) is the loudspeaker signal, and h(n) is the impulse response from the loudspeaker to microphone including the reflection. In an ideal case, without any transducer and sensor dynamics included, the impulse response would comprise only the direct sound and reflected sounds. That is, the model would be a combination of one or more Diracs $$h(n) = \sum_{k=1}^{K} c_k \delta(n - d_k).$$

Figure 8:
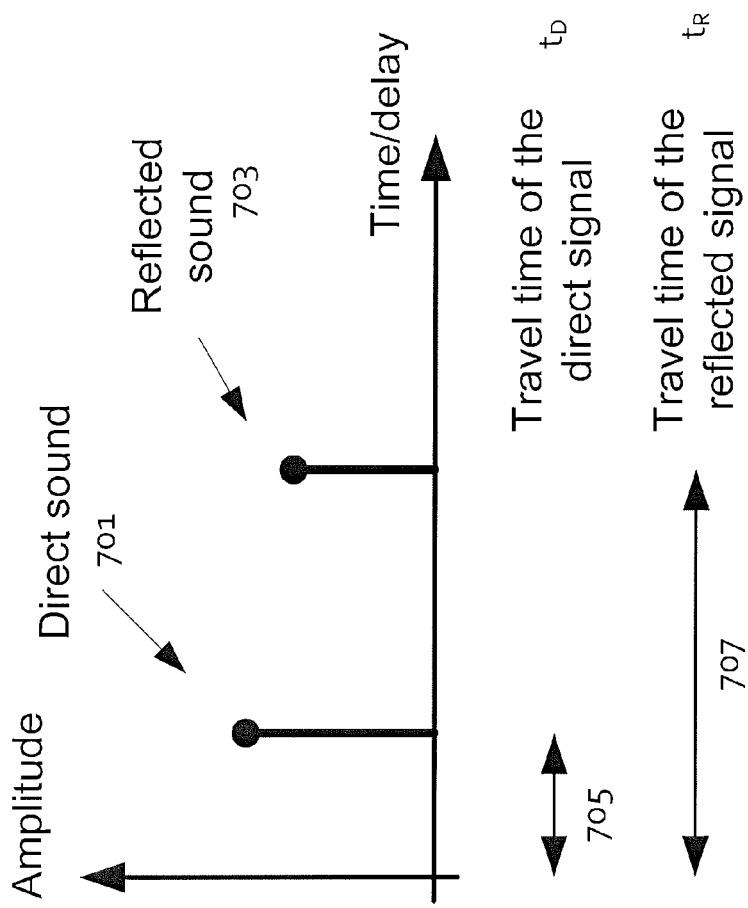
FIG. 8 shows a schematic view of an idealised impulse response from the speaker to the microphone.

In case of just one reflecting object, K=1. In the above expression, $c_k$ represents the magnitude of the direct sound or reflection, and $d_k$ is a delay equivalent to the time it takes the sound to travel from the loudspeaker to the microphone (directly and via reflection). As shown in FIG. 8 an ideal impulse response comprising the response due to direct sound 701 with relatively low delay $t_D$ 705 (the lower the closer the microphone is to the microphone) and the response due to reflected sound 703 with a longer delay $t_R$ 707. The delay time values can then be determined by the pulse train analyser 109 and object distance determiner uses the delay value to determine the location of the reflective object as described herein.

Figure 3:
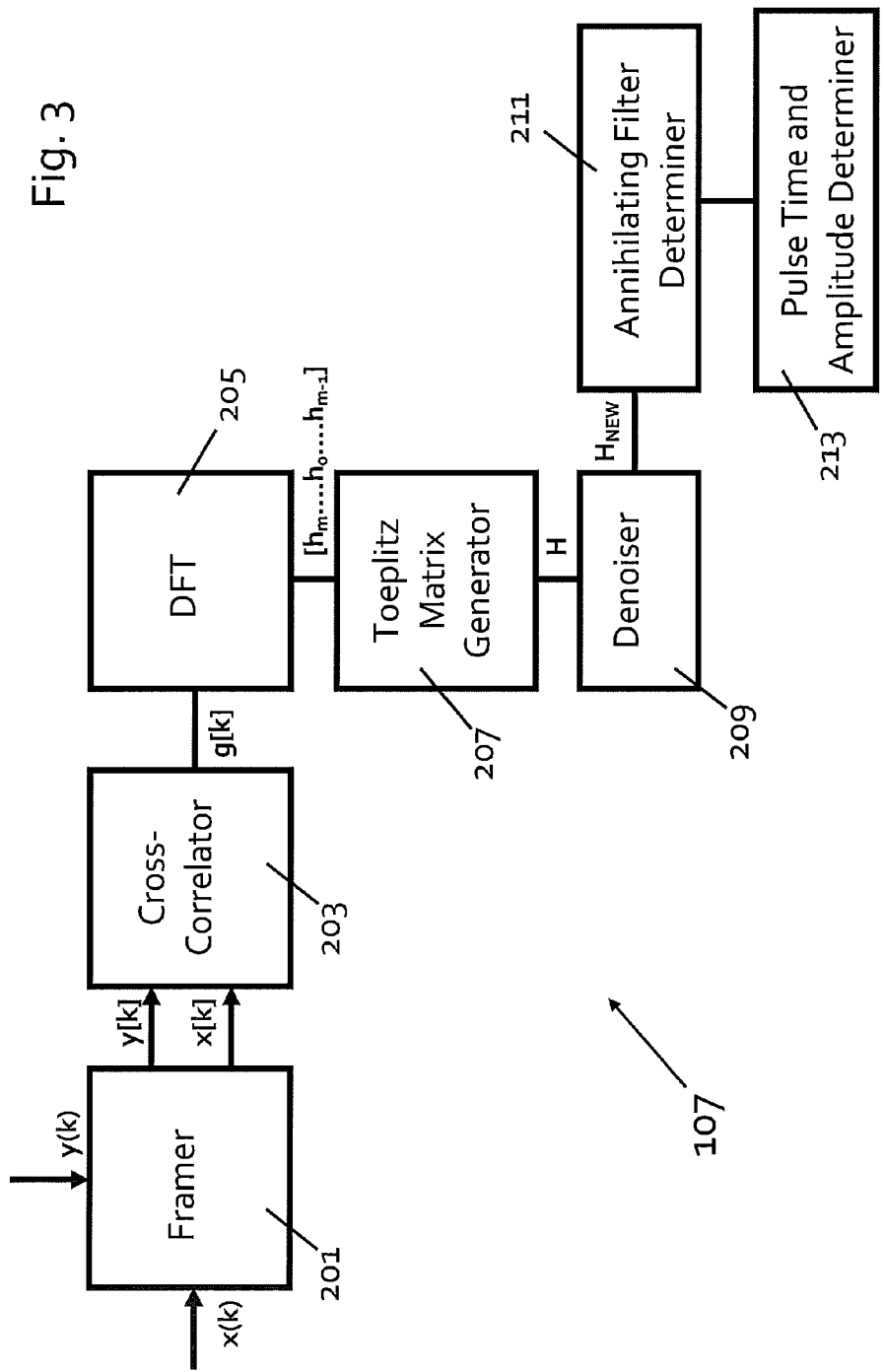
FIG. 3 shows schematically an impulse response modeller as shown in FIG. 2 in further detail.

With respect to FIG. 3 the impulse response modeller 107 is shown in further detail according to some embodiments of the application. Furthermore with respect to FIG. 5 the operation of the impulse response modeller according to some embodiments of the application is shown.

Figure 5:
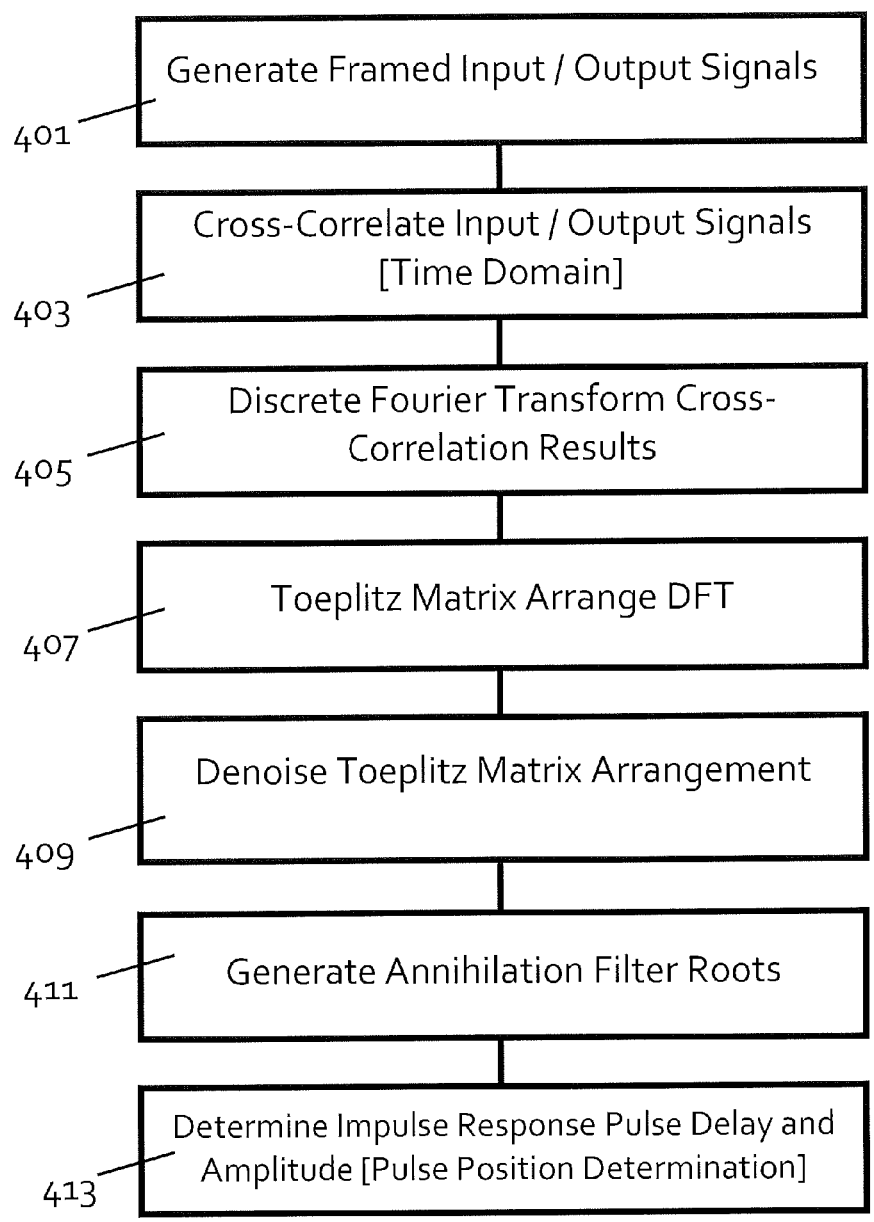
FIG. 5 shows a flow diagram showing the operation of impulse response modelling according to some embodiments of the application.

The impulse response modeller is shown in FIG. 3 and described in FIG. 5 with respect to a single loudspeaker to microphone sound source, in other words having received a single one of the multiple outputs from the filter 105. It would be appreciated that in some embodiments parallel sets of apparatus can be implemented in order to perform parallel operations for each of the audio sources. Furthermore in some embodiments the same apparatus can be used whereby each audio source is processed separately one after another. In some embodiments a hybrid parallel/serial configuration can be implemented. The means for determining the impulse response model pulse train may in some embodiments be considered to comprise means for transforming the at least one audio signal into a sparse representation domain and means for sparse sensing the at least one audio signal in the sparse representation domain to determine the impulse response model pulse train.

In some embodiments the impulse response modeller 107 comprises a framer 201. The framer 201 is configured to receive the filtered captured sound and the original sound source. The framer 201 is configured to divide the captured audio signal and the original audio signal into frames. In some embodiments the frames are windowed overlapping frames. In some other embodiments the framer 201 is configured to generate non-overlapping frames. The output of the framer 201 is passed to the cross correlator 203. The apparatus therefore be considered in at least one embodiment to comprise means for framing the at least one audio signal before cross-correlating.

The operation of generating frame input and output signals is shown in FIG. 5 by step 401.

In some embodiments the impulse response modeller 107 is configured to comprise a cross correlator 203. The cross correlator receives the framed input and output signal, in other words the captured microphone filtered signal and the original signal respectably and is configured to cross correlate these signals to generate a cross correlation product for a range of values.

The impulse response as described here can be estimated using the cross correlation of the input signal to the loudspeaker x(k) and output signal from the microphone y(k) according to the following expression:

$$g(k) = \sum_{m=-\infty}^{\infty} x(m)y(k+m).$$

As described however the cross correlation product is calculated in some embodiments using the signal split into frames. That is, the signal outside the current frame is considered as zero. In some embodiments the signal available in previous frames can be applied. The means for transforming the at least one audio signal into a sparse representation domain may in at least one embodiment as described herein comprise means for cross-correlating the at least one audio signal against a reference signal.

The operation of the cross correlator to generate cross correlated input and output signals is shown in FIG. 5 by step 403.

The cross correlator 203 is configured to output the cross correlation products to a discrete fourier transformer (DFT) 205.

In some embodiments the impulse response modeller 107 is configured to comprise a discrete fourier transformer (DFT) 205. The discrete fourier transformer is configured to receive the cross correlation products from the cross correlator 203 and generate a series of discrete fourier transform components for each cross correlation product.

A compressed sensing method enables reconstruction of an input signal using far fewer samples than the Nyquist sampling theorem requires. The underlying idea of the compressed sensing protocol is to rely on the sparse representation of the input data when capturing and process only a subset of the incoming data samples. The information rate is thus considered lower than the actual Nyquist sampling rate as presented for example in introductory publication [E. Candes, et al, "A introduction to compressed sampling", IEEE Signal Processing Magazine, March 2008]. The advantage of compressed sensing as employed in some embodiments of the application is the low data rate at the capturing side while the reconstruction can be done using computational power at the receiving side.

The compressed sensing method as employed in some embodiments applies a specific sensing mechanism to the input signal. The means for sparse sensing in at least one embodiment therefore as described herein may comprise: means for discrete fourier transforming the sparse domain representation of at least one audio signal; means for organizing the discrete fourier transform products into a Toeplitz form; means for determining the annihilating filter roots associated with the Toeplitz form discrete fourier transform products; and means for determining the impulse response model pulse train pulse times and amplitudes based on the annihilating filter root values. The signal as described herein is first converted into sparse representation domain (such as for example the application of the cross correlator to generate the sparse signal of the direct and first reflected signal) after which the sparse sensing can take place.

For example, let f(n) be the vector that is obtained by transforming the input signal x(n) with a n×n transform matrix Ψ, which could be e.g. discrete Fourier transform (DFT). That is, the input signal x(n) is first represented in transform domain as f(n)=Ψx(n). The intention is that the data representation in the given transform domain is sparse in such a manner that the input signal can be later reconstructed using only a subset of the original data. In this case, the effective bandwidth of transformed signal f is so low that any small number of samples is sufficient to reconstruct the original input signal x(n). The subset of transformed input data consisting of m values (m<n) is acquired with a m×n sensing matrix φ consisting of row vectors $\phi_k$ as follows $$y_k = \langle f, \phi_k \rangle, k=1, \ldots, m.$$

If for example the sensing matrix φ contained only Dirac delta functions, the measured vector y would simply contain sampled values of f. Alternatively, the sensing matrix may pick m random coefficients or simply m first coefficient of the transform domain vector f. Naturally, there are other possibilities for the sensing matrix in other embodiments, for example in some embodiments the sensing matrix can be a complex valued matrix with random coefficients.

There are several methods to reconstruct the input signal x(n) using the measured vector y and the knowledge of sensing and transform matrices φ and Ψ. In the examples described herein an Annihilating filter typically used in spectral estimation [O. Roy, et al, "Distributed sensing of signals linked by sparse filtering", Proceedings of IEEE International Conference on Audio, Speech, and Signal Processing ICASSP 2009, pp 2409-2412, Taipei, Taiwan, Apr. 19-24, 2009] is employed.

Since the cross correlation function is expected to be sparse (in other words it is expected that there are only the direct and a single reflection) it is possible to apply a compressed sensing approach to find the Diracs corresponding to reflected signal travel time. The cross correlation function in such embodiments is therefore transformed into the DFT domain for further analysis. Furthermore in some embodiments the DFT 203 is configured to transform the cross correlation function covering only a subset of possible delays k as only the reflected signal travel time is of interest.

Reconstruction of the sparse signal using the Annihilating filter method uses complex domain transform coefficients of a sparse signal. The sparse input f (the cross correlation products) are therefore first transformed using either a random complex valued matrix in some embodiments. For example a DFT transform is used.

The operation of performing the discrete time cross correlation fourier transform is shown in FIG. 5 by step 405.

The discrete area transformer 205 is configured to output the direct transform components to a Toeplitz matrix generator 207.

In some embodiments the impulse response modeller 107 is configured to comprise a Toepliz matrix generator 207. The Toepliz matrix generator is configured to generate a Toepliz matrix of the discrete fourier transform products of the cross correlated products. In other words to arrange the discrete fourier transform products into Toepliz form.

In such embodiments instead of reconstruction the autoregressive (AR) residual of each input channel, the compressed sensing domain coefficients can be used directly to model position and amplitude of the Diracs in the impulse response. Thus by determining m+1 or more transform domain coefficients from the impulse response the model can be created by first constructing the H matrix as follows $$H = \begin{bmatrix} h_0 & h_{-1} & \ldots & h_{-m} \\ h_1 & h_0 & \ldots & h_{-m+1} \\ \vdots & \vdots & \vdots & \vdots \\ h_{m-1} & h_{m-2} & \ldots & h_{-1} \end{bmatrix}$$

where the coefficients $h_k$ are the DFT domain representation of the impulse response coefficients determined by using the input to the loudspeaker x(k) and output from the microphone y(k).

The operation of arranging the discrete fourier transform components into a Toeplitz matrix form is shown in FIG. 5 by step 407.

The Toeplitz matrix generator 207 is configured to output the Toeplitz matrix of discrete fourier transform products to a denoiser 209.

In some embodiments the impulse response modeller 107 comprises a de-noiser 209 configured to remove noise from the Toeplitz matrix form H. The de-noiser 209 is configured to output the de-noised Toepliz matrix form to an annihilating filter determiner 211.

The m×(m+1) matrix H constructed using the Toepliz matrix generator 207, can in some situations have compressed sampled coefficients with a poor signal to noise (SNR) ratio. For example quantisation of the DFT transform coefficients can generate this type of poor signal to noise ratio. In these situations the compressed sensing method described herein can provide p+1 coefficients where (p+1>m+1).

Therefore the denoising filter is configured in some embodiments to iteratively first conducts a singular value determination (SVD) decomposition of the p×(p+1) matrix as H=UΣV*, set the smallest p−m eigenvalues to zero, build up the new diagonal matrix $\Sigma_{new}$ and reconstruct the matrix $H_{new}=U\Sigma_{new}V^*$. The resulting matrix $H_{new}$ in some embodiments may not necessarily be in Toeplitz form any more after the eigenvalue operation. Therefore in such embodiments the resulting matrix $H_{new}$ is forced into Toeplitz form by averaging the coefficients on the diagonals above and below the actual diagonal coefficients. The resulting denoised matrix can in some embodiments be SVD decomposed again. This iteration can performed in some embodiments any suitable number of times until the eigenvalues smallest p−m eigenvalues are zero or close to zero, or the $(m+1)^{th}$ eigenvalue is smaller than the $m^{th}$ eigenvalue by some determined threshold.

In such embodiments by using the denoising algorithm by setting all but few first eigenvalues to zero, the reconstruction of the impulse response may be converged to only few nonzero coefficient $u_k$ representing the direct and reflected sound. The coefficient $n_k$ represents the delay, and the corresponding amplitude $c_k$ represents the level. The apparatus may thus in some embodiments be considered to further comprise means for denoising the Toeplitz form discrete fourier transform products.

The operation of de-noising the Toepliz matrix is shown in FIG. 5 by step 409.

In some embodiments the impulse response modeller 107 is configured to comprise an annihilating filter determiner 211 the annihilating filter determiner 211 receives the de-noised Toeplitz matrix and is configured to determine an annihilation filter root value associated with the de-noised Toeplitz matrix. The annihilating filter determiner 211 is then configured to output the filter root values to the pulse time amplitude determiner 213.

In other words once the denoising operation is completed, the Annihilating filter can in some embodiments be applied to find the positions and amplitudes of the sparse coefficients of the sparse input data f. It should be noted that the m+1 transform coefficients $y_k$ need to be taken from the denoised Toeplitz matrix $H_{new}$.

The annihilating filter determiner 211 in some embodiments reconstructs data reconstruction by using the m×(m+1) Toeplitz matrix using the acquired transform coefficients and their complex conjugates $y_{-m}=y^*_m$. Hence, 2m+1 coefficients are needed for the reconstruction as shown mathematically here:

$$H = \begin{bmatrix} y_0 & y_{-1} & \cdots & y_{-m} \\ y_1 & y_0 & \cdots & y_{-m+1} \\ \vdots & \vdots & \vdots & \vdots \\ y_{m-1} & y_{m-1} & \cdots & y_{-1} \end{bmatrix},$$

The complex domain coefficients of the DFT or random coefficient transform have the knowledge embedded about the positions and amplitudes of the coefficients of the sparse input data. Hence, as the input data was considered sparse, it is expected that the Toeplitz matrix contains sufficient information to reconstruct the data.

In practice, the complex domain matrix contains the information about the combination of complex exponentials in the transform domain. These exponentials represent the location of nonzero coefficients in the sparse input data f. The exponentials therefore appear as resonant frequencies in the Toeplitz matrix H. Therefore in some embodiments the annihilating filter determiner 211 is configured to determine the annihilating polynomial that has zeros exactly at those locations cancelling the resonant frequencies of the complex transform. The annihilating filter determiner finds the polynomial $$A(z) = \prod_{i=0}^{m-1}(1 - u_i z^{-1})$$

such that H*A(z)=0.

The roots $u_k$ of the polynomial A(z) contain the information about the resonance frequencies of the complex matrix H. The annihilating filter determiner in some embodiments therefore determines these root values by using singular valued decomposition (SVD) and determining the eigenvector that solves H*A(z)=0. The SVD decomposition can be written as H=UΣV*, where U is an m×m unitary matrix, Σ is a m×(m+1) diagonal matrix containing the in nonnegative eigenvalues on the diagonal, and V* is a complex conjugate (m+1)×(m+1) matrix containing the corresponding eigenvectors. As noted, the matrix H is of the size m×(m+1), and therefore, the rank of the matrix is m (at maximum). Hence, the smallest eigenvalue is zero and the corresponding eigenvector in matrix V* provides the Annihilating filter coefficients solving H*A(z)=0.

In general the roots of the Annihilating polynomial represent the impulse response FIR filter consisting of several taps by applying the de-noising the Annihilating filter A(z) still has m+1 roots, but there are only a few nonzero coefficients $c_k$.

The operation of generating annihilation filter root is shown in FIG. 5 by step 411.

The pulse time and amplitude determiner 213 is configured to determine the impulse response pulse delay and amplitude values.

The pulse time and amplitude determiner 213 can once the polynomial A(z) is found, solve the m roots of the form $u_k=e^{j2\pi k/N}$ to find the positions $n_k$ of the nonzero coefficients in the input data f. The pulse time and amplitude determiner 213 furthermore in some embodiments can find the corresponding amplitudes $c_k$ for the reconstructed pulses. Having the roots of the Annihilating filter and the positions and the first m+1 transform coefficients $y_k$, the in amplitudes can be determined in some embodiments by using m equations according to Vandermonde system as follows:

$$\begin{bmatrix} 1 & 1 & \cdots & 1 \\ u_0 & u_1 & \cdots & u_{m-1} \\ \vdots & \vdots & \vdots & \vdots \\ u_o^{m-1} & u_1^{n-1} & \cdots & u_{m-1}^{m-1} \end{bmatrix} \begin{bmatrix} c_0 \\ c_1 \\ \vdots \\ c_{m-1} \end{bmatrix} = \begin{bmatrix} y_0 \\ y_1 \\ \vdots \\ y_{m-1} \end{bmatrix}.$$

The operation of determining the impulse response pulse delay and amplitude values is shown in FIG. 5 by step 413. In some embodiments the pulse time and amplitude determiner operations are performed by the pulse train analyser 109.

In the following examples with two audio sources, there are two different impulse responses.

The application of an impulse response model to generate the direct and reflection pulse trains for each captured distinguishable signal is shown in FIG. 4 by step 309.

In some embodiments the apparatus 10 comprises a pulse train analyser 109. The pulse train analyser 109 is configured to determine the distance between the microphone and speaker for each distinguishable signal. In other words using the known speed of transmitted sound it is possible to determine from the delay between the transmission of the signal and the pulses of the direct and reflected pathway reception of the signal the distance travelled by the audio waves. In some embodiments the pulse train analyser 109 is further configured to receive a known or calibrated distance between the microphone and the speaker in order to directly calibrate the distance and provide an accurate reference point to assist determining the reflected path distance.

The operation of analysis of the pulse train to determine the distance for each distinguishable signal for the reflected and in some embodiments direct pathways is shown in FIG. 4 by step 311.

Furthermore for each of the distinguished pulse train analysed distances values are passed to the object distance determiner 111.

In some embodiments the apparatus 10 further comprises an object distance determiner 111 which is configured to receive the distance values generated by the pulse train analyser 109 and configured to analyse these distances to determine a reflection object distance from the apparatus using triangulation and the known values of the distance from the speakers and microphones. Furthermore in some embodiments the object distance determiner 111 can be configured to determine the position of the reflection or object in the proximity causing the reflection. Furthermore in some embodiments by analysing a series of known positions or distances the motion of the object can be furthermore determined or the object can be tracked.

The object distance determiner 111 can determine object proximity sensing from the emitted predetermined short audio burst from the loudspeaker being detected as a corresponding received signal with one or more microphones. The object distance determiner does so by measuring the time it takes for the audio burst to travel to the microphone and determining the corresponding distance when the speed of sound is known in the surrounding medium, such as air or water.

Figure 6A:
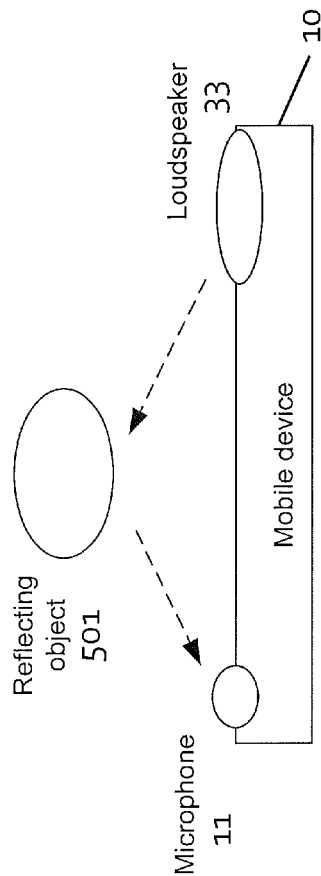
FIGS. 6a and 6b show schematically a proximate object with respect to a single loudspeaker and microphone configuration.
Figure 6B:
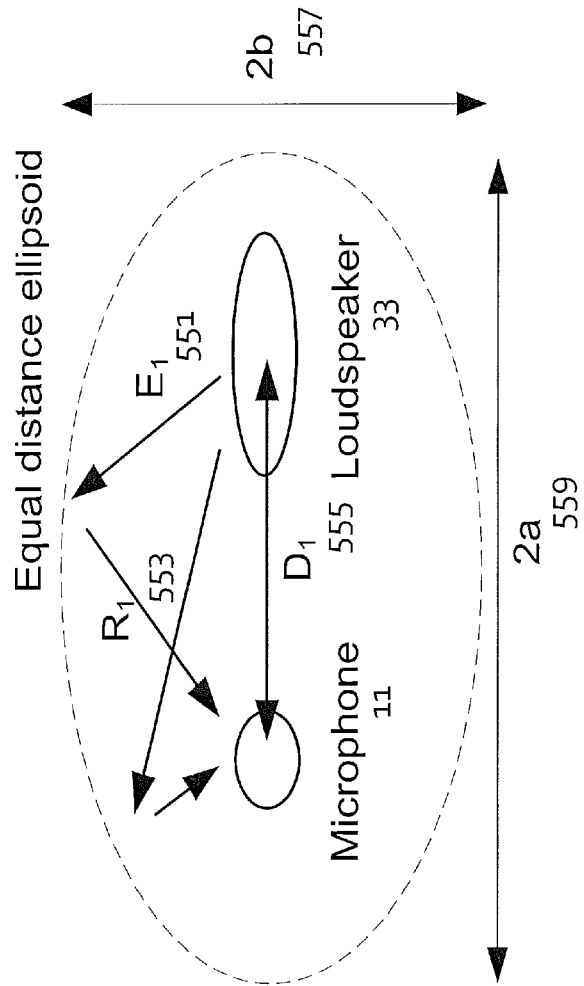

A schematic example reflecting the principle can be seen with respect to FIGS. 6a and 6b showing one of the reflected pathways from the loudspeaker 33 to the microphone 11 mounted on the apparatus or mobile device 10. An audio burst is emitted from the loudspeaker 33 and the reflected signal 'bounced' off the reflected object 501 is detected with a microphone 11. When the distance between the loudspeaker and the microphone is known shown as $D_1$ 555 in FIG. 6b, as well as the time of flight of the audio burst $t_{R1}$ and the speed of sound in air, the distance to the reflecting object $E_1$ 551+$R_1$ 553 can be determined. Using a single timing a equal distance ellipsoid 557 is defined with minor axis 2b 557 and major axis 2a 559 defined on the focal points defined by the microphone 11 and loudspeaker 33.

In some embodiments the object distance determiner 111 can estimate the distance by detecting the amplitude differences of the microphone signal since the further the sound has to travel the more it is attenuated.

Figure 7A:
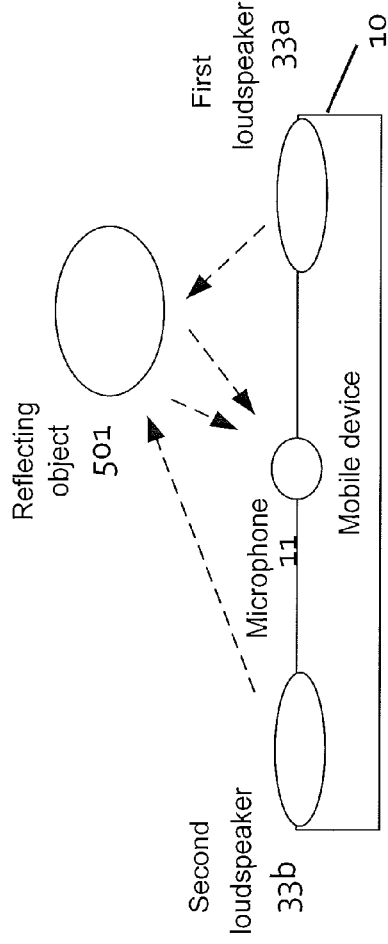
FIGS. 7a and 7b, show schematically a proximate object with respect to two speaker and single microphone configuration.
Figure 7B:
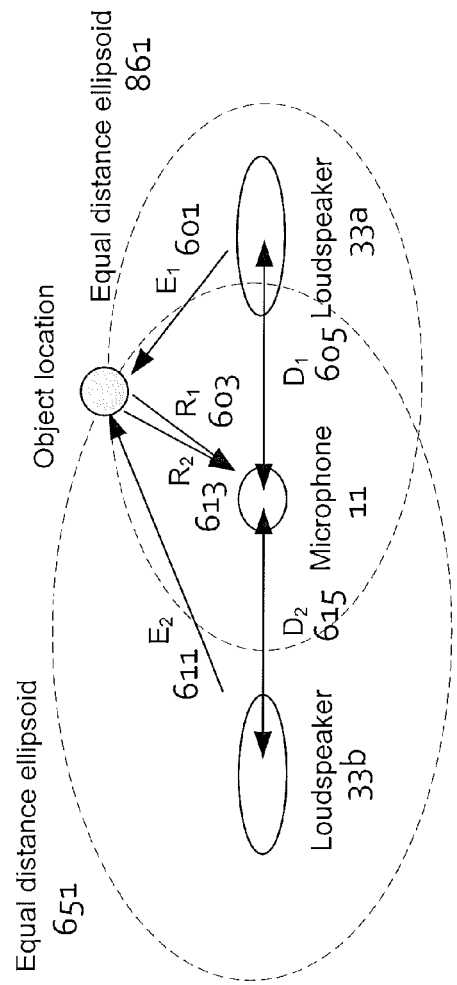

A further example is shown with respect to FIGS. 7a and 7b showing a multi-loudspeaker 33a and 33b, single-microphone 11 configuration of the apparatus 10 with the reflecting object 501 in proximity. The proximity of the object to the mobile device or apparatus 10 can in such embodiments be determined by the object distance determiner from the values of each loudspeaker-microphone pair separately by determining the time the sound travels from the loudspeaker 33a, 33b to the microphone 11. When the speed of sound, as well as the distance $D_1$ 605 and $D_2$ 615 between the first loudspeaker 33a and microphone 11 and second loudspeaker 33b and microphone 11 respectively are known the distance to the reflecting object 501 can be determined. Furthermore, when the location of the different loudspeakers 33a and 33b relative to the microphone 11 are known the location of the reflecting object can be determined.

As the travel time of the reflected sound is determined as $$T = \frac{E_1 + R_1}{c},$$

where c is the speed of sound and the distance the emitted and reflected sound travels is defined as $E_1$ 601 and $R_1$ 603, respectively the major axis of the ellipsoid is defined as 2a=Tc. That is, the sum of distances from the reflecting object to microphone and loudspeaker is related to major axis as $2a=E_1+R_1$. Furthermore the minor axis of the ellipse is determined using Pythagoras equation as $$b = \sqrt{\left(\frac{E_1+R_1}{2}\right)^2 - \left(\frac{D_1}{2}\right)^2}.$$

As a result the position of the reflecting object 501 can be defined by the object distance determiner 111 as being on the ellipse and hence the reflecting object is located somewhere on the surface of the ellipsoid defined by the major and minor axis and the centre point between the two focal points (loudspeaker and microphone). The object distance determiner 111 can therefore in some embodiments determine the position coordinates (x,y) of the reflecting object 501 on the plane perpendicular to the device 10 according the equation:

$$\frac{x^2}{a^2} + \frac{y^2}{b^2} = 1.$$

The object distance determiner 111 furthermore improves the location estimate by using data determined from the second sound source 33b which emits as discussed herein a sound distinguishable from that of the first source. The object distance determiner 111 having determined the travel time of the first sound source and determined major and minor axis of the corresponding ellipse $(a_1,b_1)$, is configured to do the same to determine the second sound source ellipsoid components $(a_2,b_2)$. The object distance determiner 111 can therefore determine the location of the reflecting object (x,y) relative to the microphone by solving the equation pair:

$$\frac{\left(x+\frac{D_1}{2}\right)^2}{a_1^2} + \frac{y^2}{b_1^2} = 1,$$

$$\frac{\left(x-\frac{D_2}{2}\right)^2}{a_2^2} + \frac{y^2}{b_2^2} = 1.$$

In practice, the resulting location coordinates (x,y) form a circle around the device 10 (in three dimensions). In other words the third location coordinate is not possible to determine without an additional cue from a third sound source. However in most circumstances the two-dimensional coordinates provide suitable information about the proximity to the reference point (which is the microphone location in the example described above).

In other words in some embodiments there comprises means for determining an presence of an object from the at least one impulse model pulse train. In some embodiments the means for determining an presence of an object from the at least one impulse model pulse train comprise a means for determining an object reflection pulse train delay value; and means for determining the object reflection distance based on the object reflection pulse train delay value.

In at least one embodiment the means for determining at least one impulse model pulse train may comprise means for determining at least two distinguishable signal impulse model pulse trains. Furthermore in such embodiments the means for determining the object from the at least one impulse model pulse train may comprise means for determining an object reflection pulse train delay value for each impulse model pulse train and means for determining the object location based on the object reflection pulse train delay value for each impulse model pulse train. The apparatus may further comprise means for determining from at least two object locations the motion of the object.

In some embodiments the tracking of the object can be used to control functionality of the apparatus. For example by waving in the plane of the apparatus a call can be disabled or muted. Furthermore by moving the object (such as a hand) further from or nearer the apparatus the volume of the output can be controlled. In some embodiments the tracking of proximity objects can be used to prevent acoustic shock—such as experienced as the apparatus is placed to the ear as the user wishes to use the earpiece but the apparatus is still in a handsfree mode and operating the handsfree speakers at too high a level to be used in earpiece modes. Therefore in some embodiment there can further comprise a means for determining the object reflection distance is less than a first defined value; and means for controlling a function of the apparatus dependent on determining the object reflection distance is less than a first defined value. These controlling means can in some embodiments comprise at least one of a means for controlling a speaker output level and a means for waking the apparatus from standby.

The operation of comparing distances to determine reflection object distance, position or motion can be shown in FIG. 4 by step 313.

Figure 9:
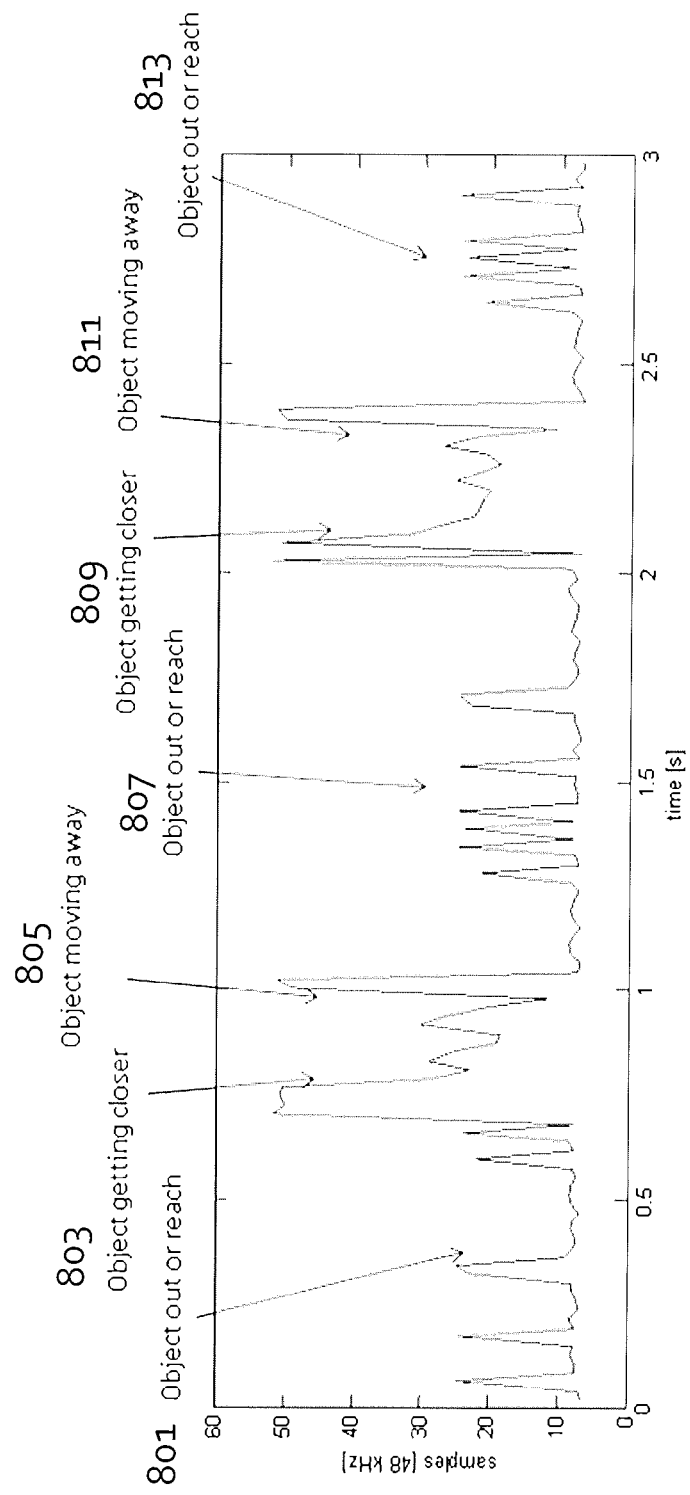
FIG. 9 shows an example of the performance of a simulation of one of the embodiments of the application.

With respect to FIG. 9 an example of the results of the proximity estimation using the impulse response method according to some embodiments of the application is shown. FIG. 9 shows the position of the Dirac peak in the impulse response, i.e. the coefficient $n_k$, corresponding to the reflected sound. The hand motion is clearly visible in the results. The hand is initially out of range/reach 801 but is first detected around time instant 0.7 seconds, when it gets closer to the device 803. Soon after that the hand is moved away 805 from the device disappearing around time instant 1.0 seconds. The same pattern is repeated at 2.0-2.4 seconds where the hand is initially out of range/reach 807, comes into range 809 and then moves away 811 before going out of range/reach again 813.

These results indicate that by using the nominal (around 40% of the scale) sound volume setting, a maximum range or distance of the object can be detected in 50 samples, which corresponds to approximately 0.34 m. As the hand moves further away, the impulse response contains mainly noise and no meaningful proximity estimation is available. The amplitude $c_k$ of the Dirac peak can be used for determining the reliability of the estimation. The results of this example show the closest position of the hand around 18 samples, corresponding to a 0.12 m distance.

It shall be appreciated that the term user equipment is intended to cover any suitable type of wireless user equipment, such as mobile telephones, portable data processing devices or portable web browsers.

Furthermore elements of a public land mobile network (PLMN) may also comprise apparatus as described above.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Similarly in at least one other embodiment there can comprise an apparatus comprising at least one processor and at least one memory including computer code, the at least one memory and the computer code configured to with the at least one processor cause the apparatus to at least perform: determining at least one impulse response model pulse train from at least one audio signal; and determining an object from the at least one impulse model pulse train.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

Furthermore there can be a computer-readable medium encoded with instructions that, when executed by a computer perform: determining at least one impulse response model pulse train from at least one audio signal; and determining an object from the at least one impulse model pulse train.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus comprising:
   at least one processor; and
   at least one memory including computer code, the at least one memory and the computer code configured, with the at least one processor, to cause the apparatus to:
   transmit from a first speaker a first audio signal;
   transmit from a second speaker a second audio signal;
   receive at least one audio signal using at least one microphone, wherein the at least one audio signal comprises a combination of a direct pathway and a reflected pathway first and second audio signals;
   determine a distance value based on the received at least one audio signal; and
   determine a presence of an object from the distance value.

2. The apparatus as claimed in claim 1, wherein determine a presence of an object comprises:
   determine at least one impulse response model;
   determine an object reflection delay value; and
   determine an object reflection distance based on the object reflection delay value.

3. The apparatus as claimed in claim 2, wherein determine a presence of an object further comprises:
   determine the object reflection distance is less than a first defined value; and
   control a function of the apparatus dependent on the determined object reflection distance.

4. The apparatus as claimed in claim 3, wherein control a function of the apparatus comprises at least one of:
   control a speaker output level; and
   wake the apparatus from standby.

5. The apparatus as claimed in claim 2, wherein determine at least one impulse response model comprises determine at least two distinguishable signal impulse models, and wherein determine a presence of an object from the at least one impulse model comprises:
   determine an object reflection delay value for each impulse model;
   determine an object location based on the object reflection delay value for each impulse model; and
   determine a motion of the object based on the determined object location.

6. The apparatus as claimed in claim 2, wherein determine the at least one impulse response model comprises:
   transform the at least one audio signal into a sparse representation domain; and
   sparse sense the at least one audio signal in the sparse representation domain to determine the impulse response model.

7. The apparatus as claimed in claim 6, wherein transform the at least one audio signal into the sparse representation domain comprises at least one of:
   cross-correlate the at least one audio signal against a reference signal; and
   frame the at least one audio signal before the at least one audio signal is cross-correlated.

8. The apparatus as claimed in claim 6, wherein sparse sense comprises at least one of:
   discrete Fourier transform the cross-correlated at least one audio signal;
   organize the discrete Fourier transform products into a Toeplitz form;
   determine the annihilating filter roots associated with the Toeplitz form discrete Fourier transform products; and
   determine the impulse response model pulse times and amplitudes based on the annihilating filter root values.

9. The apparatus as claimed in claim 8, wherein the at least one memory and the computer code are further configured, with the at least one processor, to cause the apparatus to:
   denoise the Toeplitz form discrete Fourier transform products before determining the annihilating filter roots.

10. A method comprising:
    transmitting from a first speaker a first audio signal;
    transmitting from a second speaker a second audio signal;
    receiving at least one audio signal using at least one microphone, wherein the at least one audio signal comprises combination of a direct pathway and a reflected pathway first and second audio signals;
    determining a distance value based on the received at least one audio signal; and
    determining a presence of an object from the distance value.

11. The method as claimed in claim 10, wherein determining a presence of an object comprises:
    determining at least one impulse response model;
    determining an object reflection delay value; and
    determining an object reflection distance based on the object reflection delay value.

12. The method as claimed in claim 11, wherein determining a presence of an object further comprises:
    determining the object reflection distance is less than a first defined value; and
    controlling a function of an apparatus dependent on determining the object reflection distance.

13. The method as claimed in claim 12, wherein controlling a function of an apparatus comprises at least one of:
    controlling a speaker output level; and
    waking the apparatus from standby.

14. The method as claimed in claim 11, wherein determining at least one impulse response model comprises determining at least two distinguishable signal impulse models, and wherein determining a presence of an object from the at least one impulse model comprises:
    determining an object reflection delay value for each impulse model;
    determining an object location based on the object reflection delay value for each impulse model; and
    determining a motion of the object based on determining object locations.

15. The method as claimed in claim 11, wherein determining the at least one impulse response model comprises:
    transforming the at least one audio signal into a sparse representation domain; and sparse sensing the at least one audio signal in the sparse representation domain to determine the impulse response model.

16. The method as claimed in claim 15, wherein transforming the at least one audio signal into the sparse representation domain comprises at least one of:
cross-correlating the at least one audio signal against a reference signal; and
framing the at least one audio signal before cross-correlating.

17. The method as claimed in claim 15, wherein sparse sensing comprises at least one of:
discrete Fourier transforming the cross-correlated at least one audio signal;
organizing the discrete Fourier transform products into a Toeplitz form;
determining the annihilating filter roots associated with the Toeplitz form discrete Fourier transform products; and
determining the impulse response model pulse times and amplitudes based on the annihilating filter root values.

18. The method as claimed in claim 17, further comprising:
denoising the Toeplitz form discrete Fourier transform products before determining the annihilating filter roots.

* * * * *